US011116193B2

(12) United States Patent
Shim

(10) Patent No.: US 11,116,193 B2
(45) Date of Patent: Sep. 14, 2021

(54) FISHING LIGHT FOR LONG-LINE FISHERY

(71) Applicant: CENTRO CORPORATION, Goyang-si (KR)

(72) Inventor: Woo Gil Shim, Goyang-si (KR)

(73) Assignee: CENTRO CORPORATION, Goyang-si (KR)

( * ) Notice: Subject to any disclaimer, the term of this patent is extended or adjusted under 35 U.S.C. 154(b) by 0 days.

(21) Appl. No.: 16/992,358

(22) Filed: Aug. 13, 2020

(65) Prior Publication Data

US 2021/0045365 A1    Feb. 18, 2021

(30) Foreign Application Priority Data

Aug. 13, 2019  (KR) .......................... 10-2019-0098751

(51) Int. Cl.
*A01K 85/01*  (2006.01)
*F21V 3/02*  (2006.01)
(Continued)

(52) U.S. Cl.
CPC ................ *A01K 85/01* (2013.01); *F21V 3/02* (2013.01); *F21V 23/02* (2013.01); *F21V 33/008* (2013.01); *G02B 6/001* (2013.01); *F21Y 2115/10* (2016.08)

(58) Field of Classification Search
CPC ...... A01K 85/01; A01K 75/02; A01K 87/007; F21V 33/008
(Continued)

(56) References Cited

U.S. PATENT DOCUMENTS 3,828,177 A * 8/1974 Day .................... G02B 6/0005
                                                          43/17.6
4,799,327 A * 1/1989 Treon .................... A01K 85/01
                                                          43/17.6
(Continued)

FOREIGN PATENT DOCUMENTS

JP    2003346506    12/2003
JP    2007087614    4/2007
(Continued)

*Primary Examiner* — William N Harris
(74) *Attorney, Agent, or Firm* — Lex IP Meister, PLLC

(57) ABSTRACT

A fishing light for long-line fishery according to an exemplary embodiment of the present is structurally improved to enhance the attraction effect of tuna using light by making a luminous body formed by an LED to be appeared large in the water.

A fishing light for a long-line fishery according to an exemplary embodiment of the present invention includes a housing 4 where a pair of batteries 14 are received and a cap 2 that is coupled to the housing 4 in a waterproof state, a substrate 12, which is provided with an LED 6 and a light guiding member 16 that guides light from the LED 6 by partially transmitting and partially reflecting in a light guide 164, is provided between the cap 2 and the housing 4 to realize a luminous body that extends in an axis direction through refractive diffusion of the light of the LED 6 through the light guiding member 16, and the light guiding member 16 may be provided as a single or as a pair. The light guiding member 16 may be disposed to face the inside of the cap 2 or the inside of the housing 6, and the housing 4 may further include a polygonal portion 44 at an outer side thereof to further diffuse light emitted from the light guiding member 16 disposed thereinside to the width direction.

10 Claims, 10 Drawing Sheets

(51) Int. Cl.
*F21V 23/02* (2006.01)
*F21V 33/00* (2006.01)
*F21V 8/00* (2006.01)
*F21Y 115/10* (2016.01)

(58) Field of Classification Search
USPC .................................................. 47/17.5, 17.6
See application file for complete search history.

(56) References Cited

U.S. PATENT DOCUMENTS

| | | | | |
|---|---|---|---|---|
| 5,076,003 | A * | 12/1991 | Chen | A01K 85/01 43/17.5 |
| 5,299,107 | A * | 3/1994 | Ratcliffe | A01K 85/01 200/220 |
| 6,203,170 | B1 * | 3/2001 | Patrick | A01M 29/10 362/234 |
| 6,481,148 | B1 | 11/2002 | Lindgren | |
| 6,732,469 | B2 * | 5/2004 | Lindgren | A01K 85/01 362/158 |
| 8,157,409 | B2 * | 4/2012 | Sim | F21S 9/02 362/231 |
| 2003/0115787 | A1 * | 6/2003 | Lindgren | A01K 85/01 43/17.6 |
| 2013/0044497 | A1 * | 2/2013 | Sakamoto | G09F 13/04 362/311.04 |
| 2016/0114868 | A1 * | 4/2016 | Burke | G02B 6/0008 362/477 |

FOREIGN PATENT DOCUMENTS

| | | |
|---|---|---|
| JP | 2011171261 | 9/2011 |
| KR | 10-2003-0090387 | 11/2003 |
| KR | 10-2011-0045795 | 5/2011 |
| KR | 10-1367873 | 2/2014 |

* cited by examiner

First exemplary embodiment Second exemplary embodiment Third exemplary embodiment Existing fishing light

FISHING LIGHT FOR LONG-LINE FISHERY

CROSS-REFERENCE TO RELATED APPLICATION

This application claims priority to and the benefit of Korean Patent Application No. 10-2019-0098751 filed in the Korean Intellectual Property Office on Aug. 13, 2019, the entire contents of which are incorporated herein by reference.

BACKGROUND OF THE INVENTION

(a) Field of the Invention

The present invention relates to a fishing light that emits light in water to attract tuna to a tuna long-line, and more particularly, it relates to a fishing light for a long-line fishery that has been improved so that a luminous body looks large.

(b) Description of the Related Art

The number of fish caught at any given time in a tuna long-line fishery is a very important concern for those in the field.

Since tuna is attracted by light emitted by squid and the like in the water, conventionally, long-line fishery has used fishing lights that emit light in the water as a means to increase the catch per hour.

For example, Patent Document 1 discloses "electroluminescent fish attraction means" used for connection to a fishing line.

The disclosed electroluminescent fish attracting means is formed of a battery, an LED, and a mercury tilt switch that turns the LED on and off in a waterproof housing.

The mercury tilt switch flashes the LED with an intermittent opening and closing operation, and the waterproof housing is made of a transparent material so that the LED flashing light can be seen from the outside.

In such a configuration, the light emission time of the LED is determined by the battery capacity.

In the disclosed fishing light of Patent Document 1, the adopted battery is a button type and has small capacity, and thus it is not suitable for tuna long-line fishing because the flashing time is short.

As another example, "underwater lighting fishing lure" disclosed in Patent Document 2 employs two AA batteries as a power source to significantly extend the usage time. In addition, it has a function of which a waterproof housing is switched when water pressure is applied, and a function of allowing an external surface of the battery to reflect and diffuse light of the LED, or a function of spreading the light of the LED on the waterproof housing by mixing a light-reflecting material on the wall surrounding the battery in the waterproof housing.

Reflecting the light of the LED on the external surface of the battery or mixing the reflective material with the wall surrounding the battery so that the light of the LED is reflected is expected to have an advantage of enhancing the attraction effect of tuna by making a luminous body appear larger.

However, in the former case, an outer surface of a commercially available battery cannot reflect light, and thus it has to be ordered separately. In the latter case, it is very disadvantageous in terms of manufacturing cost due to the hassle of manufacturing and technical problems because it must be injected by mixing reflective particles or reflective beads in the waterproof housing made of a polycarbonate material.

PRIOR ART DOCUMENT

Patent Document

U.S. Pat. No. 5,299,107
U.S. Pat. No. 6,481,148

SUMMARY OF THE INVENTION

One aspect of the present invention is to provide a fishing light for long-line fishery that is structurally improved to enhance the attraction effect of tuna using light by making a luminous body formed by an LED to be appeared large in the water.

A fishing light for a long-line fishery according to an exemplary embodiment of the present invention includes a housing where a pair of batteries are received and a cap that covers the housing and waterproofs the same.

A substrate, which is provided with an LED and a light guiding member that guides light from the LED by partially transmitting and partially reflecting in a light guide, is provided between the cap and the housing to realize a luminous body extending in an axis direction through refractive diffusion of the light of the LED through the light guiding member.

In the fishing light for the long-line fishery according to the exemplary embodiment of the present invention, the light guiding member may be provided as a single or as a pair.

When one light guiding member is provided, the light guiding member is provided with a recess portion extending in a length direction at an outer surface thereof.

When the light guiding member is provided as a pair, each light guiding member extends in a side direction of a battery receiving space of the housing.

The cap and the substrate may be coupled by a ball joint method using a ball stud and a ball collet, or by using a conventional screw.

In addition, the housing may further include a polygonal portion for diffusing light emitted from the inner light guiding member in the width direction.

The light guiding member may be disposed from the substrate toward the inside of the cap.

In the fishing light according to the exemplary embodiment of the present invention, the light guiding member may further include a light diffusion portion of a convex shape that is continuous along the length direction.

According to the exemplary embodiment of the present invention, the light of the LED appears as a luminous body that emits light across the entire light guiding member by repeating some transmission and some reflection on the light guide of the light guiding member such that visibility in the water can be improved.

In addition, when the light guiding member is disposed in pairs, the diffusion effect of the light emitting area is doubled and thus it can be seen from a long distance.

In addition, when the cap and the substrate are connected by a ball joint method, assembly work becomes simple thereby improving productivity.

In addition, in the case where the polygonal portion is provided in the housing, light emitted from the light guiding member is refracted and diffused in the width direction again, thereby exhibiting a luminous body in a wider area.

In addition, when the light guiding member is disposed from the substrate toward the inside of the cap, the luminous body expressed through the light guiding member is not obscured by the contour of the battery such that the light guiding member can be clearly seen.

When the light guiding member further includes a light diffusion portion, the outline of the contour of the luminous body is further diffused, and thus the luminous body having the largest area can be displayed.

DETAILED DESCRIPTION OF THE EMBODIMENTS

Figure 1:
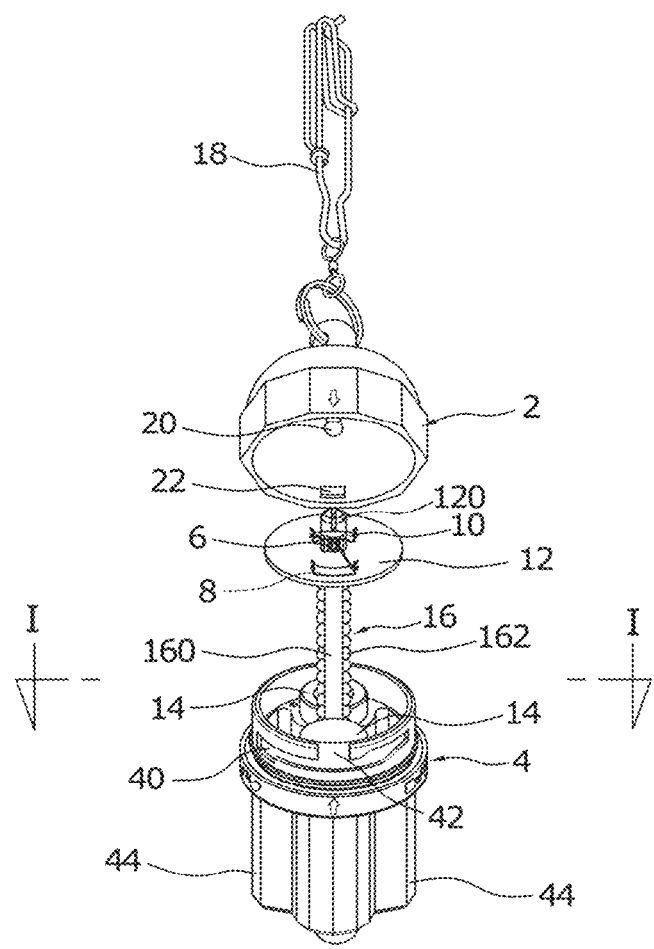
FIG. 1 is an exploded perspective view of a fishing light according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In this specification and drawings, the same reference numerals designate the same constituent elements.

The drawings and description are to be regarded as illustrative in nature and not restrictive. Like reference numerals designate like elements throughout the specification.

In addition, since the size and thickness of each component shown in the drawings are arbitrarily shown for convenience of explanation, the present invention is not necessarily limited to what is shown.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 is an exploded perspective view of a fishing light according to an exemplary embodiment of the present invention.

A fishing light according to an exemplary embodiment includes a cap 2 formed of transparent colorless or colored polycarbonate, a housing 4, a substrate 12 including an LED 6 and a pair of contact points 8 and 10 that are electrically connected to the LED 6, a pair of batteries 14 received in the housing 4, and a light guiding member 16 that is disposed between the pair of batteries 14.

Figure 2:
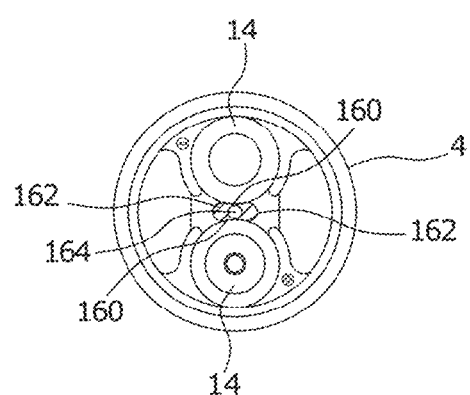
FIG. 2 is a cross-sectional view of FIG. 1 taken along the line I-I.

In the present exemplary embodiment, a recess portion 160 that is fitted between the pair of batteries 14 is formed at the circumference of the light guiding member 16, while extending in a length direction of the light guiding member 16, a plurality of convex-type light diffusion portions 162 are arranged to be continuous along the length direction on both sides of the recess portion 160, and a light guide 164 in the form of a space is provided at an internal center of the light guiding member 16 as shown in FIG. 2

In assembling, the recess portion 160 of the light guiding member 16 is positioned to match the space between the pair of batteries 14 such that the light diffusion portion 162 is exposed to the outside through a gap between the two batteries 14.

Although it is not necessary, the LED 6 is a polarized element, and thus it is convenient to use it when the polarity of each battery 14 is indicated by "+" and "−".

Referring back to FIG. 1, a long line clip 18 is provided on an external upper end of the cap 2, a ball stud 20 is provided to be connected with the substrate 12 at an internal center of the cap 2, and one or a pair of protrusions 22 are provided at a predetermined position in an internal circumferential surface of the cap 2 to guide coupling with the housing 4.

A ball collet 120 that is fitted to the ball stud 20 is disposed at a center of the substrate 12 on the opposite side of the light guiding member 16.

Meanwhile, a guide channel 40 is formed as an intaglio on the outer circumference surface of the housing 4 combined with the cap 2 such that the protrusion 22 is inserted thereinto and then guided.

The channel 40 is divided into a switching-on region and a switching-off region depending on locations with reference to an inlet 42, but such a structure is the same as that applied to conventional fishing lights, and thus detailed descriptions thereof are omitted.

In addition, the circumference of the end of housing 4 is formed by polygonal portions 44.

The LED light diffused and emitted through the light guiding member 16 causes refraction at the edge boundary of the polygonal portion 44 when passing through the housing 4, and the refraction at this time is limited in the width direction of the light guiding member 16, thereby causing an effect of making the width of the luminous body visualized outside appear larger than it actually is.

Figure 3:
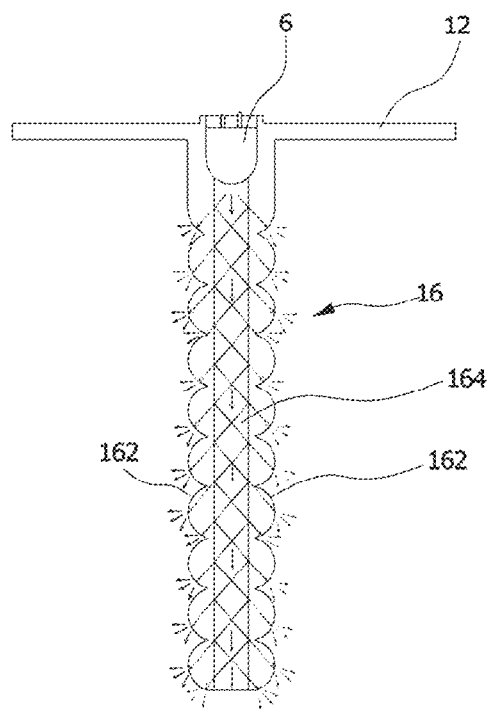
FIG. 3 is a schematic view provided for description of a light diffusion effect of the fishing light according to the present invention.

The light diffusion action by the light guiding member 16 in the fishing light of the present invention made of the above-described configuration will now be described with reference to FIG. 3.

Among light emitted from the LED 6, light emitted in parallel with the light guide 164 is directly transmitted and thus irradiated to the bottom side of the housing 4, and light emitted in a radiation direction and thus incident on an inner side surface of the light guide 164 is partially transmitted along the dotted lines in the drawing and partially reflected.

The reflected light is irradiated again to the inner side surface of the light guide 164 and thus repeats partial transmission and partial reflection, and accordingly, the light of the LED 6 has a long diffused shape in the length direction of the light guiding member 16 from the outside.

The light transmitted through the light guide 164 is emitted to the outside through the light guiding member 16, and light reflection occurs while the light passes through the spherical surface of the continuously arranged light diffusion portions 162, thereby causing diffusive emission.

Accordingly, the light emitted from the LED 6 diffuses evenly according to the length direction of the light guiding member 16.

In addition, light diffused widely through the spherical surface of the light diffusion portion 162 is refractively diffused again along the width direction while passing through the polygonal portion 44 of the housing 2 such that a wide luminous body can be realized.

Figure 4:
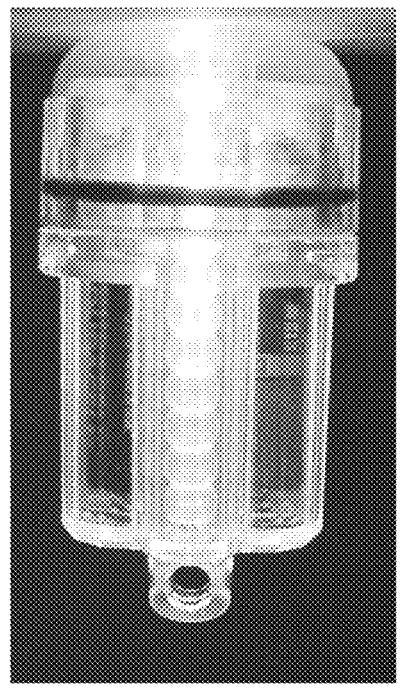
FIG. 4 is a photograph showing a lighting state of the fishing light to which the first exemplary embodiment is applied.

The luminous body of which light is diffused while being transmitted through the light guiding member 16 and the polygonal portion 44 is realized as a continuous bead shape that extends long and wide between both batteries as shown in the photo of FIG. 4.

The exemplary embodiment described above exemplarily shows a structure having one light guiding member 16, but the present invention is not limited thereto.

Figure 5:
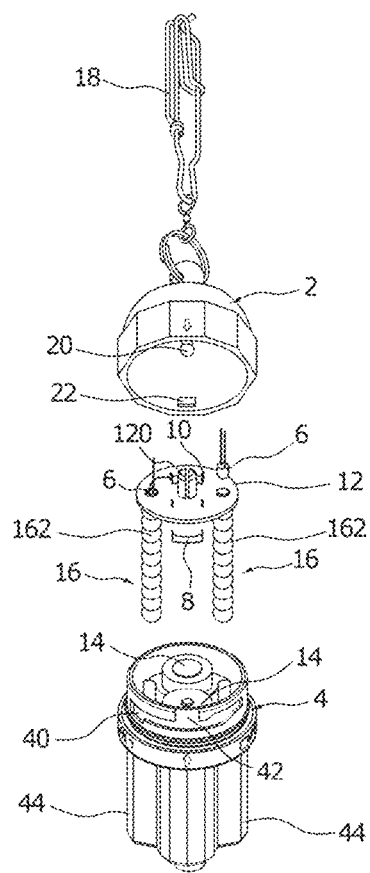
FIG. 5 is an exploded perspective view of a fishing light according to a second exemplary embodiment of the present invention.

FIG. 5 is view of a fishing light according to another exemplary embodiment of the present invention.

Like the fishing light according to the above-described exemplary embodiment, a fishing light according to the present exemplary embodiment includes a cap 2, a housing 4, a substrate 12 having a pair of contact points 8 and 10, and a pair of batteries 14 received in the housing 4, but in the fishing light according to the present invention, a pair of LEDs 6 and a pair of light guiding members 16 are disposed in the substrate 12 and one light guiding member 16 is assigned to each LED 6, and a recess portion 160 is omitted in the light guiding members 16.

Figure 6:
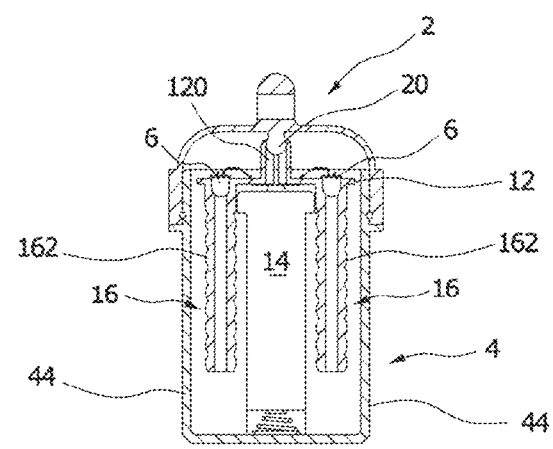
FIG. 6 is a side cross-sectional view of an assembled structure of the second exemplary embodiment.

With the above-described configuration, in the fishing light according to the present exemplary embodiment, the pair of light guiding members 16 are symmetrically disposed in a side direction of a receiving space in both batteries 14 inside the housing 4 as shown in FIG. 6 such that two rows of luminous bodies are realized.

In this case, since power from the two batteries 14 is simultaneously applied to the two LEDs 6, battery consumption is increased by two times compared to the above-described exemplary embodiment, but visibility is increased by two times since two luminous bodies are realized in the housing 4.

Figure 7:
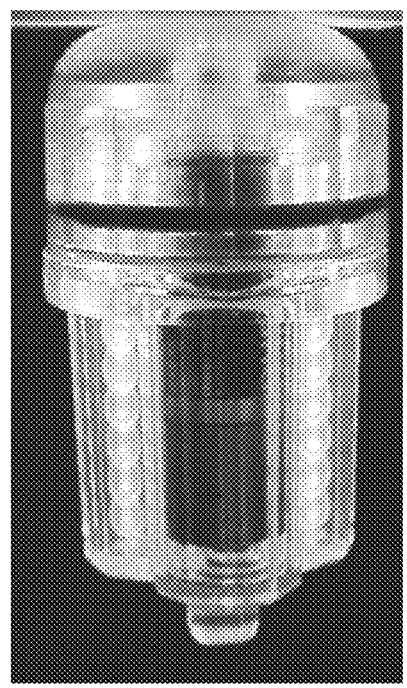
FIG. 7 is a photograph showing a lighting state of the fishing light to which the second exemplary embodiment is applied.

That is, as shown in the photo of FIG. 7, two rows of wide and long luminous bodies are realized through two polygon portions 44 provided in the housing 4, such that the fishing light appears large.

All the light guiding members 16 are extended into the housing 4 in the above-described exemplary embodiment, but the present invention is not limited thereto, and the light guiding members 16 may extend toward the inside of the cap 2.

Figure 8:
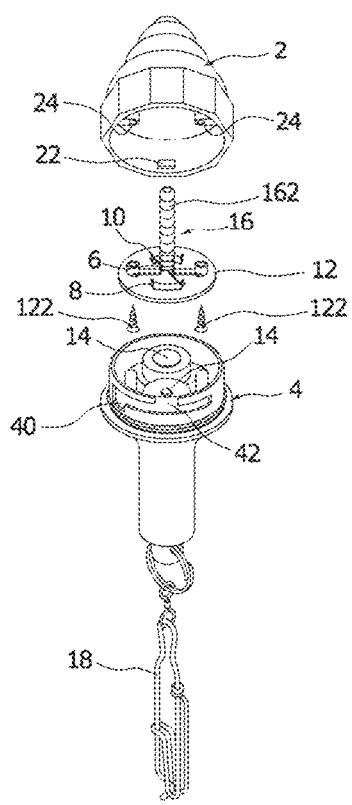
FIG. 8 is an exploded perspective view of a fishing light according to a third exemplary embodiment of the present invention.

FIG. 8 shows a fishing light according to a third exemplary embodiment of the present invention, and compared to the two above-described exemplary embodiments, in a fishing light according to the present exemplary embodiment, an LED 6 is disposed to face toward a cap 2 at a center of a substrate 12, a light guiding member 16 where light diffusion portions 162 are continuously arranged is disposed to face toward an inner side of the cap 2 corresponding to the LED 6, while the substrate 12 is integrally coupled with the cap 2 by screws 122 that are fastened to screw holes 24 provided at the inner side of the cap 2, and a polygonal portion 44 is not provided in the housing 4. Except for such a configuration, others are the same as in the two above-described exemplary embodiments.

Figure 9:
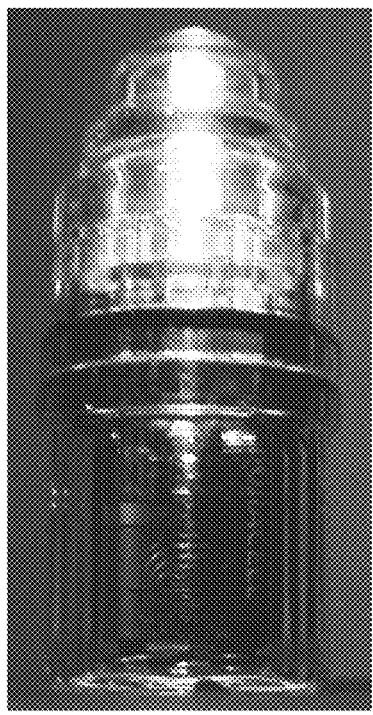
FIG. 9 is a photograph showing a lighting state of the fishing light to which the third exemplary embodiment is applied.

As shown in the photo of FIG. 9, in the fishing light to which the present exemplary embodiment is applied, a luminous body is realized inside the cap 2 and vertically extended, but the cap 2 is not provided with a polygonal portion such that the light of the realized luminous body is not diffused in a width direction.

As described above, the fishing light according to the present invention adopts the light guiding member such that a luminous body of which light extends long can be realized, and a width directional diffusion effect of the luminous body can be achieved by adopting the polygon portion.

Figure 10:
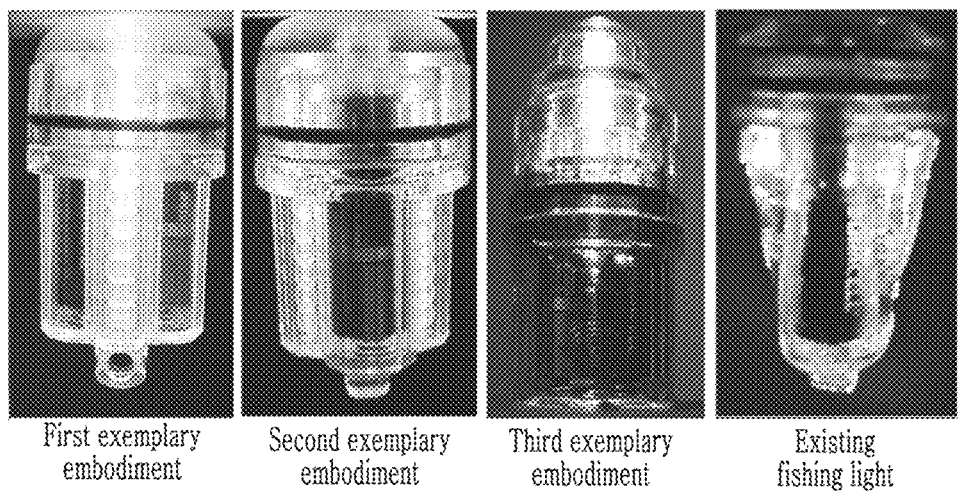
FIG. 10 is a photograph showing a lighting state of the fishing light according to the first to third exemplary embodiments and a lighting state of a commercially available conventional fishing light.

Comparing the luminous body of the fishing light according to the first to third exemplary embodiments with a fishing light which is commercially available and where a pair of LEDs are arranged, as shown in FIG. 10, the commercially available fishing light realizes a luminous body having a limited area in the LED and some area around it, but in the fishing light according to the present invention, a luminous body having a remarkably long length and wide width can be realized.

As described above, since the fishing light according to the present invention is excellent in visibility in the water, it can be expected to improve the catch amount of fish in the long line fishing.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

| <Description of symbols> | |
| --- | --- |
| 2: cap | |
| 20: ball stud | 22: protrusion |
| 24: screw hole | |
| 4: housing | |
| 44: polygonal portion | |
| 6: LED | 8, 10: contact portion |
| 12: substrate | |
| 120: ball collet | 122: screw |
| 14: battery | |
| 16: light guiding member | |
| 160: recess portion | 162: light diffusion portion |
| 164: light guide | |
| 18: long line clip | |

What is claimed is:
1. A fishing light for a long-line fishery, comprising:
a cap (2) where one or a pair of protrusions (22) are formed at an inner circumferential surface;
a housing (4) where a pair of batteries (14) are received, and provided with a channel (40) for guiding the protrusion (22);
a substrate where an LED (6) is disposed at a center thereof and a pair of contact points (8 and 10) are arranged around the LED; and
a light guiding member (16) where a light guide (164) that guides light of the LED (6) by partially transmitting the light and partially reflecting the light is formed at an inner center thereof, and a recess portion (160) that matches a gap between the two batteries (14) received in the housing (4) is formed in a length direction at an outer circumference.

2. A fishing light for a long-line fishery, comprising:
a cap (2) where one or a pair of protrusions (22) are formed at an inner circumferential surface;
a housing (4) where a pair of batteries (14) are received, and provided with a channel (40) for guiding the protrusion (22);
a substrate (12) where a pair of LEDs (6) is disposed and a pair of contact points (8 and 10) are arranged around the LEDs (6); and
a pair of light guiding members (16) where light guides (164) that guide light of the LEDs (6) by partially transmitting the light and partially reflecting the light are formed at inner centers, and disposed while extending in a side direction of a receiving space of each battery (14) in the housing (4) to visually realize two rows of luminous bodies.

3. The fishing light for a long-line fishery of claim 1, wherein a ball stud (20) is provided at an inner center of the cap (2), and a ball collet (120) that is fitted into the ball stud (20) is provided in the substrate (12).

4. The fishing light for a long-line fishery of claim 1, wherein the housing (4) further comprises a polygonal portion (44) that makes light emitted from the light guiding member (16) disposed in the housing to be diffused in a width direction.

5. A fishing light for a long-line fishery comprising:
a cap (2) where one or a pair of protrusions (22) and screw holes (24) are formed at an inner circumferential surface;
a housing (4) where a pair of batteries (14) are received, and provided with a channel (40) for guiding the protrusion (22);
a substrate (12) provided with a pair of contact points (8 and 10) that are integrally coupled with the cap (2) by screws (122) engaged through the screw holes (24) and contact the battery (14); and
a light guiding member (16) that is disposed to face an inner side of the cap (2) together with an LED (6) at a center of the substrate (12), and includes a light guide (164) that guides light of the LED (6) by partially transmitting and partially reflecting the light.

6. The fishing light for a long-line fishery of claim 1, wherein a convex-shaped light diffusion portion (162) is formed continuously along a length direction at an outer side of the light guiding member (16) to refractively diffuse light emitted from the light guiding member (16).

7. The fishing light for a long-line fishery of claim 2, wherein a ball stud (20) is provided at an inner center of the cap (2), and a ball collet (120) that is fitted into the ball stud (20) is provided in the substrate (12).

8. The fishing light for a long-line fishery of claim 2, wherein the housing (4) further comprises a polygonal portion (44) that makes light emitted from the light guiding member (16) disposed in the housing to be diffused in a width direction.

9. The fishing light for a long-line fishery of claim 2, wherein a convex-shaped light diffusion portion (162) is formed continuously along a length direction at an outer side of the light guiding member (16) to refractively diffuse light emitted from the light guiding member (16).

10. The fishing light for a long-line fishery of claim 5, wherein a convex-shaped light diffusion portion (162) is formed continuously along a length direction at an outer side of the light guiding member (16) to refractively diffuse light emitted from the light guiding member (16).

* * * * *